United States Patent [19]

Ohara

[11] Patent Number: 5,332,320
[45] Date of Patent: Jul. 26, 1994

[54] PRINTING APPARATUS WITH MODE SELECTION

[75] Inventor: Kiyotaka Ohara, Nagoya, Japan

[73] Assignee: Brother Kogyo Kabushiki Kaisha, Nagoya, Japan

[21] Appl. No.: 36,385

[22] Filed: Mar. 24, 1993

[30] Foreign Application Priority Data

Aug. 27, 1992 [JP] Japan .................................. 4-228698

[51] Int. Cl.⁵ .............................................. B41J 11/42
[52] U.S. Cl. ....................................... 400/76; 400/61; 395/112
[58] Field of Search ..................... 400/61, 70, 76, 692; 395/112

[56] References Cited

U.S. PATENT DOCUMENTS

| | | | |
|---|---|---|---|
| 4,926,347 | 5/1990 | Uchida et al. | 395/112 |
| 4,968,159 | 11/1990 | Sasaki et al. | 400/76 |
| 5,073,868 | 12/1991 | Tada | 395/112 |
| 5,075,874 | 12/1991 | Steeves et al. | 395/112 |
| 5,228,118 | 7/1993 | Sasaki | 395/112 |

FOREIGN PATENT DOCUMENTS 179261 9/1985 Japan .................................. 400/121

Primary Examiner—David A. Wiecking
Assistant Examiner—Steven S. Kelley
Attorney, Agent, or Firm—Oliff & Berridge

[57] ABSTRACT

A ROM connected to a CPU comprises an emulation mode A judgment unit, an emulation mode A execution unit, an emulation mode B judgment unit, an emulation mode B execution unit, an emulation mode C judgment unit, an emulation mode C execution unit, and an emulation mode automatic switching unit. A ROM cartridge capable of being freely inserted into or removed from a slot connected to the CPU comprises an emulation mode D judgment unit and an emulation mode D execution unit. When a switching table is created according to the priority order set for each emulation mode and printing information is entered, an emulation mode judgment unit selects the emulation mode by testing according to the priority order of the emulation modes.

20 Claims, 4 Drawing Sheets

Fig.2

| | PRIORITY | JUDGMENT UNIT ADDRESS | EXECUTING UNIT ADDRESS |
|---|---|---|---|
| EMULATION A | 20 | 10000000 | 15000000 |
| EMULATION B | 30 | 20000000 | 25000000 |
| EMULATION C | 40 | 30000000 | 35000000 |
| EMULATION D | 35 | 50000000 | 55000000 |

PRINTING APPARATUS WITH MODE SELECTION

BACKGROUND OF THE INVENTION

1. Field of the Invention

This invention relates to a printing apparatus which converts a control code of printing information according to any of a plurality of emulation modes and prints characters according to the converted code.

2. Description of the Related Art

Various printing apparatuses are known in which printing information including at least a control code and character codes are entered, the control code is converted by an emulation mode compatible with the control code, and characters corresponding to the character codes are printed according to the converted control code.

In such printing apparatuses, a plural number of emulation modes and judgment data respectively corresponding to the modes, which data being for determining whether or not the printing information control codes are compatible with the emulation modes, are stored in a ROM (read-only memory) in a microcomputer incorporated in the printing apparatus. The emulation mode is selected to be compatible with the control code detected from the printing information and printing is performed according to the character codes of printing information based on the selected emulation mode.

Recently many kinds of emulation modes have come to be used with such printing apparatuses. Some of such printing apparatuses are structured to use a detachable ROM cartridge storing new emulation modes which are not originally provided in the printing apparatus.

Such printing apparatuses, however, are structured to print all the printing information in the emulation mode stored in the ROM cartridge irrespective of the control code once the ROM cartridge is inserted or an instruction is given through an operation panel after inserting the ROM cartridge. Therefore, in the case where the printing information requires both the emulation mode built into the printing apparatus and the emulation mode contained in the cartridge, a cumbersome operation is required involving inserting and removing the cartridge or requiring further operations on the operation panel.

Although many kinds of emulation modes and corresponding judgment data can be stored in advance in a built-in ROM in the printing apparatus, erroneous functioning can occur with an increase in the number of emulation modes. Namely, if the number of emulation modes is increased, in some cases the corresponding judgment data are very similar to each other. In that case, a certain kind of control code could be judged as being of similar judgment data and an emulation mode could be selected which does not correctly correspond to the control code.

SUMMARY OF THE INVENTION

An object of the invention is to provide a printing apparatus capable of using many kinds of emulation modes by executing simple operations.

According to the printing apparatus of the invention, printing information including at least a control code and character codes are entered, the control code is converted by the emulation mode corresponding to the control code, and characters corresponding to the character codes are printed according to the converted control code.

The printing apparatus of the invention comprises; built-in emulation mode internal memory means in which are stored the emulation modes and respectively corresponding judgment data for judging whether or not the control code is compatible with the emulation mode, emulation modes different from those stored in the built-in emulation internal memory means capable of being freely inserted in or removed from the printing apparatus are found in an emulation mode external memory means in which are also stored judgment data for judging whether or not the control codes are compatible with the emulation modes, control code detection means for detecting the control code from the printing information entered, emulation mode selection means for selecting an emulation mode, when the emulation mode external memory means is inserted, by comparing the detected control code with the judgment data in both the built-in emulation mode internal memory means and emulation mode external memory means, and emulation mode executing means for converting the control code of the entered printing information into a peculiar control code of the printing apparatus according to the selected emulation mode.

The printing apparatus of the invention is further provided with emulation mode memory means in which are stored a plurality of emulation modes and respectively corresponding judgment data for judging whether or not the control codes are compatible with the emulation modes, priority order setting means for setting the priority order of a plurality of the stored emulation modes, control code selection means for selecting the control code from the entered control code, emulation mode selection means for selecting the emulation mode corresponding to the control code by comparing the detected control code with judgment data of the emulation mode memory means in succession in the order of priority, and emulation mode executing means for converting the control code of the entered printing information into the control code peculiar to the printing apparatus according to the selected emulation mode.

The printing apparatus of the invention structured as described above uses the emulation mode external memory, capable of being freely inserted in and removed from the printing apparatus, and has stored therein the emulation modes different from those of the emulation mode internal memory means and the judgment data for judging whether the control code is compatible with any of the emulation modes. The emulation mode selection means selects, when the emulation mode external memory means is inserted, the emulation mode corresponding to the control code detected by the control code detection means by comparing the control code with each of the data stored in both the emulation mode internal memory means and emulation mode external memory means.

Owing to this, the emulation mode corresponding to the control code can be automatically selected from the emulation modes stored in the emulation mode internal memory means and emulation mode external memory means. The emulation mode execution means converts the control code of the entered printing information into the control code peculiar to the printing apparatus according to the selected emulation mode.

Furthermore, the combined emulation mode memory means, that is, both internal and external, of the invention has in store a plurality of emulation modes and the judgment data for judging whether the control code of the printing information is compatible with each of the emulation modes, with each of the emulation modes corresponding to each of the judgment data. The priority setting means sets the priority order of a plurality of the emulation modes. The emulation mode selection means compares the control code detected by the control code detection means with each of the judgment data in the combined emulation mode memory means in succession according to the priority order and selects the emulation mode compatible with the control code.

Therefore, a required emulation mode can be correctly selected even if emulation modes having judgment data confusingly similar to each other are stored in the combined emulation mode memory means if the priority order is set according to the frequency of use. Namely, the emulation mode selection means compares the control code with each of the judgment data according to the priority order in succession and after judging the compatibility of the control code with one of the judgment data selects the emulation mode compatible with the control code. Therefore, an emulation mode of a low frequency of use relative to a control code of the printing information is prevented from being accidentally used. The emulation execution means converts the control code of the entered printing information into a control code peculiar to the printing apparatus.

With such a structure, any emulation mode can be accurately used even if many kinds of emulation modes are stored in the combined emulation mode memory means. Furthermore, since the emulation mode is selected automatically according to the control code, many kinds of emulation modes can be used by simple operations.

According to the invention, any emulation modes different from those stored in the emulation mode internal memory means can be automatically selected according to the control code by, as necessary, inserting the emulation mode external memory means storing such emulation modes. Therefore, many kinds of emulation modes can be used by using simple operations. Since the emulation mode external memory means, storing the necessary emulation modes, only has to be selectively inserted, there is no need for storing many kinds of emulation modes in advance in the emulation mode internal memory means. As a result, many kinds of emulation modes are made available without excessively increasing the number of emulation modes which are addressed by the emulation mode selection means. This prevents emulation modes having confusingly similar judgment data from existing at the same time so that the emulation modes can be used accurately.

According to the invention as described above, many kinds of emulation modes can be accurately used by simple operations.

BRIEF DESCRIPTION OF THE DRAWINGS

The invention will be described with reference to the figures, in which:

FIG. 2 is an explanatory view of a switching control table of the printing apparatus of an embodiment of the invention;

DETAILED DESCRIPTION OF THE PREFERRED EMBODIMENTS

Figure 1:
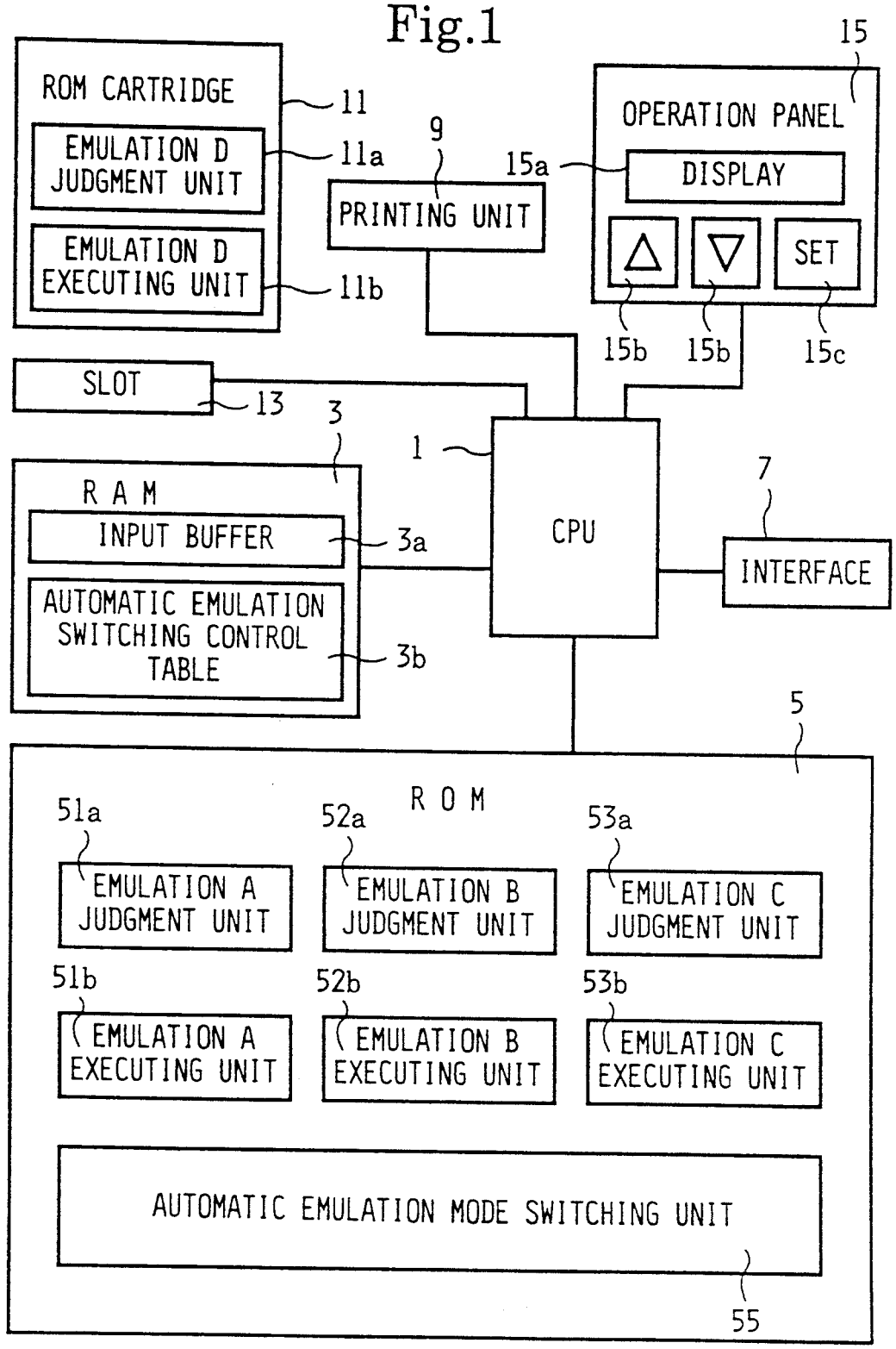
FIG. 1 is a diagrammatic view of a printing apparatus of an embodiment according to the invention.

FIG. 1 portrays a diagrammatic view of a printing apparatus of a preferred embodiment. The apparatus, for purposes of explanation only, is assumed to have three kinds of emulation modes A, B and C.

As shown in FIG. 1, the printing apparatus of the embodiment comprises a central processing unit (CPU) 1 for executing various arithmetic operations. Connected to CPU 1 are a random-access memory (RAM) 3 to which data are randomly accessed and a read-only memory (ROM) 5 in which various programs are stored, as described later. Also connected to the CPU 1 are an interface 7, for entering printing information from an external host device (not shown), a printing unit 9 for printing characters on a recording paper sheet, a slot 13 into which a detachable ROM cartridge 11, described later, can be freely inserted, and an operation panel 15 for setting the priority order of the emulation modes.

The RAM 3 comprises an input buffer 3a, for storing, through the CPU 1, the printing information entered via the interface 7, and an automatic emulation switching control table 3b for storing the priority order of the emulation modes and emulation mode addresses corresponding to the order of the emulation modes (hereinafter simply called the switching control table).

The ROM 5 corresponds to the emulation mode internal memory means or emulation mode memory means and comprises an emulation mode A judgment unit 51a storing the data for judging whether or not the printing information is compatible with the emulation mode A, an emulation mode A executing unit 51b storing the program for executing the emulation mode A, an emulation mode B judgment unit 52a, an emulation mode B executing unit 52b, an emulation mode C judgment unit 53a, an emulation mode C executing unit 53b, and an automatic emulation mode switching unit 55 storing the program for automatic emulation mode switching process which will be described later.

The detachable ROM cartridge 11 to be inserted into the slot 13 corresponds to the emulation mode external memory means and comprises an emulation mode D judgment unit 11a storing the data for judging whether or not the printing information is compatible with the emulation mode D and an emulation mode D executing unit 11b storing the program for executing the emulation mode D.

The switching control table 3b has the structure shown in FIG. 2. When the power of the printing apparatus is turned on with the ROM cartridge inserted into the slot 13, the addresses of the emulation modes A–C judgment units 51a—53a and the emulation modes A–C executing units 51b—53b and of the emulation mode D judgment unit 11a and the emulation mode D executing unit 11b are set and stored in the switching control table 3b. The address data for each of the emulation modes A–D is stored with the emulation mode's priority order. The priority order is set using the operation panel 15 as described below.

Figure 3:
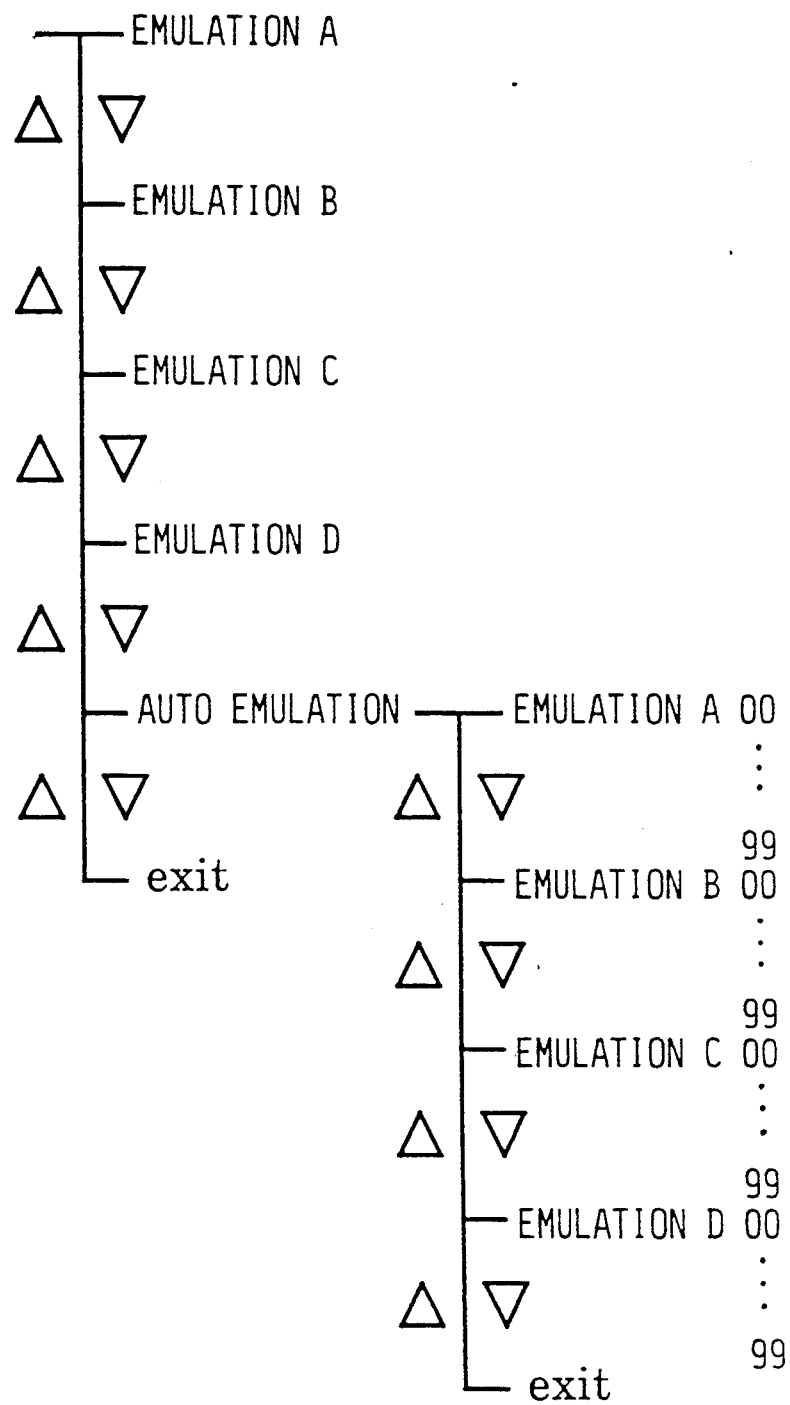
FIG. 3 is an explanatory view of the architecture of a display device of an embodiment of the invention.

As shown in FIG. 1, the operation panel 15 comprises a display 15a for displaying the setting con-tents, scroll keys 15b for scrolling up and down the image on the display 15a, and a setting key 15c for entering the setting contents shown on the display 15a. The operation panel 15 is further provided (not shown) with various other switches such as those for selecting the emulation mode. When a specific emulation mode is identified with a specific switch, the display 15a displays the contents with the architecture shown in FIG. 3.

When the emulation mode setting is instructed, the display 15a displays the currently set modes of "EMULATION A" through "EMULATION D." When the "AUTO EMULATION" is shown by operating the scroll keys 15b and the setting key 15c is then operated, the display shows "EMULATION A XX" (XX denoting the priority order currently assigned to the emulation mode A). When the down scroll key 15b is operated, the display 15a displays in succession "EMULATION B YY," "EMULATION C ZZ," and so on (YY and ZZ denoting the priority orders currently assigned to the emulation modes B and C respectively). If the setting key 15c is operated when an emulation mode of which the priority order is to be changed is displayed, the priority order of that emulation mode can be changed within the range of 00 through 99 by the operation of the scroll keys 15b. If the setting key 15c is operated when the display 15a is showing the intended priority order, the CPU 1 stores the emulation mode with the corresponding priority order in the RAM 3.

After setting the priority order of each emulation mode as described above, the CPU 1 executes the automatic emulation mode switching process described below according to the program stored in the automatic emulation mode switching unit 55.

Figure 4:
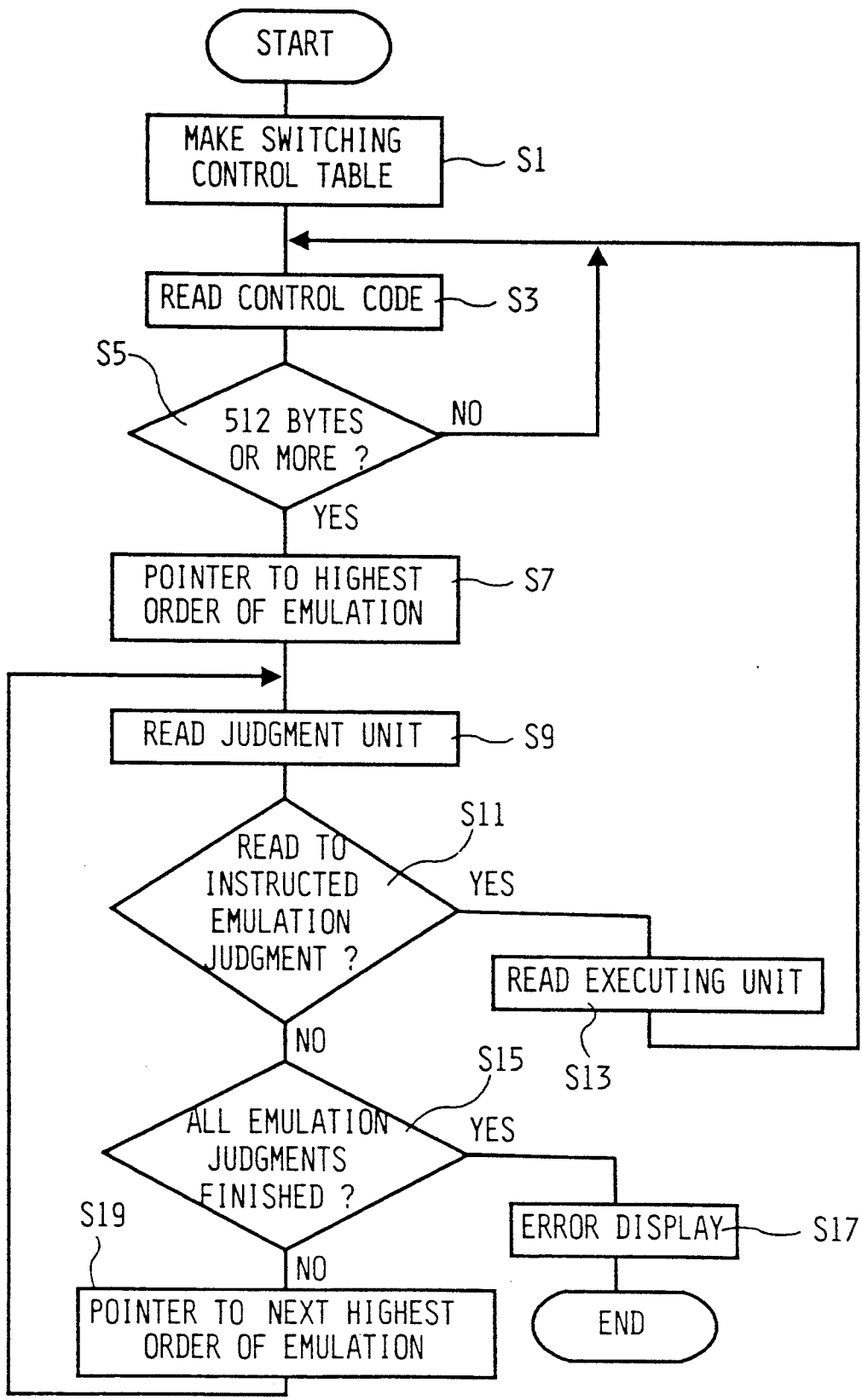
FIG. 4 is a flow chart showing the automatic switching process of emulation modes of an embodiment of the invention.

FIG. 4 is a flow chart showing the automatic emulation mode switching process. When the process is started, the switching control table 3b is created, at step S1, according to the priority order of the emulation modes set as described above. At step S3, a control code is read from the printing information entered through the interface 7 from the external host device. At step S5, a judgment is made whether the read control code has 512 bytes or more. If the number of bytes is less than 512, the process goes again to step S3 and repeats reading the control codes and when the number of bytes is 512 or more the process goes to step S7.

At step S7, the pointer of the switching control table 3b is brought to the emulation mode of the highest priority order. At the succeeding step S9, an emulation mode judgment unit (51a, 52a, 53a or 11a) indicated by the pointer is read. At step S11, a judgment is made according to the data stored in one of the emulation mode judgment units 51a through 11a whether the control code read at step S3 is compatible with the emulation mode indicated by the pointer. If compatible, the process goes to step S13 and, if not compatible, to step S15. At step S15, a judgment is made whether the judgments are finished for all the emulation modes in the switching control table 3b.

If the judgments are finished for all the emulation modes, that is the control code read at step S3 is not compatible with any of the emulation modes in the switching control table 3, the process is brought to an end at step S17 with an error message shown on the display 15a. If the judgments are not finished for all the emulation modes, the pointer of the switching control table 3b is moved to the next highest priority order at the succeeding step S19 and the process returns to step S9.

Namely, the control code read at step S3 is judged in succession, according to the priority order of the emulation modes, through the loop consisting of steps S9 through S19 and using the data of the emulation mode judgment units 51a through 11a. If the control code is judged to be compatible with the emulation mode indicated by the pointer and the process goes to step S13, the appropriate one of the emulation mode execution units 51b through 11b indicated by the pointer is read. Then the control code of the printing information entered through the interface 7 from a known type of routine (not shown) is converted to the control code peculiar to the printing unit 9. When step S13 is finished, the process goes again to step S3, reads the succeeding control code and executes similar processes.

According to the invention as described above, the emulation mode D stored in the ROM cartridge 11 can be automatically selected according to the control code of the printing information in a manner similar to that in which the emulation modes A through C, stored in advance in the ROM 5, are selected by inserting the ROM cartridge 11 into the slot 13. Therefore, many kinds of emulation modes can be used by simple operations. Also, many kinds of emulation modes can be used without increasing the number of emulation modes which need to be stored at one time in the switching table 3b because only one cartridge 11 storing necessary emulation modes has to be suitably selected and inserted. As a result, emulation modes that are confusingly similar to one another can be prevented from being present at the same time in the emulation mode judgment units 51a through 11a so that the emulation mode can be accurately selected.

Furthermore according to the embodiment, the priority order of the emulation modes A through D can be set by the operation panel 15 and the compatibility of the control code with one of the emulation modes is judged in succession according to the priority order. Therefore, a specific emulation mode can be accurately selected by setting the priority order of the emulation modes according to the frequency of use even if there are emulation modes similar to each other in the emulation mode judgment units 51a through 11a. Namely in the processing of the loop of steps S9 through S19, once an emulation mode corresponding to the control code is selected, judgment of an emulation mode having a priority order lower than that of the selected emulation mode is not executed. Therefore, there is no possibility of incorrectly selecting an emulation mode of a lower frequency of use with respect to the control code of the printing information. As a result, the printing apparatus of the embodiment is capable of very accurately using many kinds of emulation modes by simple operations.

While only one slot 13 is provided in the embodiment described above, a plurality of slots 13 may be provided if different addresses are allotted to respective slots 13. In that case, a plurality of emulation modes not stored in the ROM 5 can be used without exchanging the ROM cartridges 11 and the number of emulation modes stored in the ROM 5 may be reduced to one or two.

If the slot 13 is provided, many kinds of emulation modes can be used by appropriately selecting the ROM cartridge 11 without sacrificing the accuracy of selection even if the priority order is fixed. If a plurality of slots 13 are provided, priority order may be set to each of the slots 13. In that case, the priority order may be changed by exchanging the ROM cartridges 11.

An arrangement is also possible that stores a number of emulation modes, in advance, in the ROM 5 without providing the slot 13. In that case too, any one of the emulation modes can be accurately selected by appropriately setting the priority order.

What is claimed is:

1. A printing apparatus for printing characters by entering printing information including at least a control code and character codes, converting the control code by one of emulation modes corresponding to the control code, and printing characters corresponding to the character codes according to the converted control code, comprising:

emulation mode internal memory means built into the printing apparatus for storing an internal execution unit and an internal judgment unit, the internal execution unit storing an emulation mode, the internal judgment unit storing judgment data corresponding to the emulation mode stored in the internal execution unit and executing a judging operation which judges whether the control code detected by said control code detection means is compatible with the emulation mode stored in the internal execution unit according to the judgment data;

emulation mode external memory means structured to be freely inserted into and removed from the printing apparatus for storing an external execution unit and an external judgment unit, the external execution unit storing an emulation mode different from that stored in the internal execution unit, the external judgment unit storing judgment data corresponding to the emulation mode stored in the external execution unit and executing a judging operation which judges whether the control code detected by said control code detection means is compatible with the emulation mode stored in the external execution unit according to the judgment data;

control code detection means for detecting the control code from the entered printing information;

emulation mode selection means for selecting one of the emulation modes which corresponds to the control code, based on a result of the judging operation in one of the internal judgment unit and the external judgment unit, when said emulation mode external memory means is inserted; and emulation mode execution means for converting the control code of the entered printing information into a control code peculiar to the printing apparatus according to the emulation mode selected by said emulation mode selection means.

2. The printing apparatus of claim 1, further comprising priority order setting means for setting a priority of a plurality of emulation modes stored in both said emulation mode internal memory means and said emulation mode external memory means, wherein said emulation mode selection means selects one of the emulation modes which corresponds to the control code, based on a result of the judging operation in one of the internal judgment unit and the external judgment unit when said emulation mode external memory means is inserted and according to the priority set by said priority order setting means.

3. The printing apparatus as claimed in claim 2, further comprising a switching control table for storing an internal storing position in which the emulation modes and judgment data are stored in said emulation mode internal memory means, an external storing position in which the emulation mode and the judgment data are stored in said emulation mode external memory means, and the priority of the plurality of emulation modes is set by said priority setting means.

4. The printing apparatus as claimed in claim 3, wherein said emulation mode selection means selects a first emulation mode corresponding to the control code encountered when checking the emulation modes according to the priority stored in said switching control table.

5. The printing apparatus as claimed in claim 2, wherein said priority order setting means includes a display for displaying the plurality of emulation modes, at least one single direction cross key for indicating the emulation mode among the plurality of emulation modes displayed by said display means and a setting key for enabling the setting of an order of priority for the emulation mode indicated by said at least one single direction scroll key.

6. The printing apparatus as claimed in claim 5, wherein said at least one single direction scroll key changes the order of the priority after enablement by said setting key.

7. A printing apparatus for printing characters by entering printing information including at least a control code and character codes, converting the control code by one of a plurality of emulation modes corresponding to the control code, and printing characters corresponding to the character codes according to the converted control code, comprising:

emulation mode memory means for storing a plurality of emulation modes and a plurality of judgment data, the emulation modes and the judgment data corresponding to each other, the judgment data being for a judging operation which judges whether the control code is compatible with a one of the plurality of emulation modes;

priority order input means for operator input of a priority of the plurality of emulation modes stored in said emulation mode memory means;

control code detection means for detecting the control code from the entered printing information;

emulation mode selection means for selecting one of the emulation modes which corresponds to the control code, according to a result of the judging operation which judges whether the control code detected by said control code detection means is compatible with one of the emulation modes stored in said emulation mode memory means and according to the priority set by said priority order input means; and emulation mode execution means for converting the control code of the entered printing information into a control code peculiar to the printing apparatus according to the emulation mode selected by said emulation mode selection means.

8. The printing apparatus as claimed in claim 7, wherein said emulation mode memory means comprises an emulation mode internal memory means built into the printing apparatus for storing at least one of the plurality of emulation modes and judgment data and an emulation mode external memory means for storing at least one of the plurality of emulation modes and judgment data different from the emulation mode and judgment data stored in said emulation mode internal memory means.

9. The printing apparatus as claimed in claim 8, further comprising a switching control table for storing an internal storing position in which the emulation mode and judgment data are stored in said emulation mode internal memory means, an external storing position in which the emulation mode and the judgment data are stored in said emulation mode external memory means, and the priority of each of the plurality of emulation modes set by said priority order input means.

10. The printing apparatus as claimed in claim 9, wherein said emulation mode selection means sequentially checks the plurality of emulation modes to determine the emulation mode corresponding to the control code according to the priority stored in said switching control table.

11. A printing apparatus, comprising:
input means for inputting at least one control code and character codes;
control code detection means for detecting the inputted control code from the character codes;
emulation mode internal memory means built into the printing apparatus for storing an internal execution unit and an internal judgment unit, the internal execution unit storing an emulation mode, the internal judgment unit storing judgment data corresponding to the emulation mode stored in the internal execution unit and executing a judging operation which judges whether the control code detected by said control code detection means is compatible with the emulation mode stored in the internal execution unit according to the judgment data;
emulation mode external memory means, structured to be freely inserted into and removed from the printing apparatus, for storing an external execution unit and an external judgment unit, the external execution unit storing an emulation mode different from the stored in the internal execution unit, the external judgment unit storing judgment data corresponding to the emulation mode stored in the external execution unit and executing a judging operation which judges whether the control code detected by said control code detection means is compatible with the emulation mode stored in the external execution unit according to the judgment data;
priority order setting means for setting a priority of a plurality of emulation modes stored in both said emulation mode internal memory means and said emulation mode external memory means;
emulation mode selection means for selecting one of the emulation modes which corresponds to the control code, based on a result of the judging operation in one of the internal judgment unit and the external judgment unit when said emulation mode external memory means is inserted, and according to the priority set by said priority order setting means; and
emulation mode execution means for converting the control code of the entered printing information into a control code peculiar to the printing apparatus according to the emulation mode selected by said emulation mode selection means.

12. The printing apparatus as claimed in claim 11, further comprising a switching control table for storing an internal storing position in which the emulation modes and judgment data are stored in said emulation mode internal memory means, an external storing position in which at least one emulation mode and corresponding judgment data are stored in said emulation mode external memory means, and the priority of the plurality of emulation modes as set by said priority order setting means.

13. The printing apparatus as claimed in claim 12, wherein said emulation mode selection means selects the emulation mode corresponding to the control code by sequentially checking the judgment data according to the priority stored in said switching control table until a match is made.

14. The printing apparatus as claimed in claim 13, wherein said priority order setting means includes a display for displaying the plurality of emulation modes, at least one single direction scroll key for identifying a one of the plurality of emulation modes displayed in said display means, and a setting key for enabling the setting of an order of priority for the emulation mode identified by said scroll key.

15. The printing apparatus as claimed in claim 14, wherein said at least one single direction scroll key changes the order of the priority after enablement by said setting key.

16. A method for use with a printer for converting a control code for printing by an emulation mode, comprising the steps of:
inserting an emulation mode external memory means into a printer, the emulation mode external memory means containing at least one emulation mode executing unit and associated judgment unit storing judgment data corresponding to the emulation mode;
creating a table containing address data for the at least one emulation mode executing unit and associated judgment unit in the emulation mode external memory means and at least one emulation mode executing unit and associated judgment unit in an emulation mode internal memory means internal to the printer;
establishing by an operator a priority for each of the emulation mode executing units and associated judgment units;
inputting printing data with an associated control code;
determining whether the control code of the input printing data is compatible with one of the emulation modes in emulation mode executing units of both the emulation mode external memory means and the emulation mode internal memory means according to the judgment data stored in judgment units of both the emulation mode external memory means and the emulation mode internal memory means and according to the established priority; and
activating the emulation mode executing unit of the emulation mode compatible with the control code of the input printing data to initiate printing.

17. The method as claimed in claim 16, wherein when said determining step does not determine that the control code is compatible with the emulation mode, prior to the activating step, further comprising the steps of:
removing the emulation mode external memory means from the printer; and
inserting another emulation mode external memory means into the printer.

18. The method as claimed in claim 16, wherein said establishing step comprises the steps of:
identifying a one of paired emulation mode executing unit and associated judgment unit addresses in the table;
assigning a unique value to said pair; and
storing said unique value in the table associated with the pair.

19. The method as claimed in claim 18, wherein said determining step comprises checking the control code against each associated judgment data in the order of the assigned unique values.

20. The method as claimed in claim 16, wherein when said determining step does not determine that the control code is compatible with the emulation mode, further comprising the step of providing an error message.

* * * * *